United States Patent
Chen et al.

(10) Patent No.: US 12,028,255 B2
(45) Date of Patent: Jul. 2, 2024

(54) VIRTUAL CHANNEL SETTING METHOD AND APPARATUS FOR DATA FLOW

(71) Applicant: HUAWEI TECHNOLOGIES CO., LTD., Guangdong (CN)

(72) Inventors: Yongxian Chen, Nanjing (CN); Heyang Liu, Nanjing (CN); Jinfeng Yan, Nanjing (CN); Liyang Sun, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 381 days.

(21) Appl. No.: 17/498,756

(22) Filed: Oct. 12, 2021

(65) Prior Publication Data

US 2022/0029919 A1    Jan. 27, 2022

Related U.S. Application Data

(63) Continuation of application No. PCT/CN2020/084548, filed on Apr. 13, 2020.

(30) Foreign Application Priority Data

Apr. 17, 2019    (CN) .......................... 201910309167.9

(51) Int. Cl.
*H04L 47/122*    (2022.01)
*H04L 47/2425*    (2022.01)

(52) U.S. Cl.
CPC ........ *H04L 47/122* (2013.01); *H04L 47/2425* (2013.01)

(58) Field of Classification Search
CPC .......................... H04L 47/22; H04L 47/2425
See application file for complete search history.

(56) References Cited

U.S. PATENT DOCUMENTS 4,905,231 A * 2/1990 Leung ..................... H04L 12/56
370/400
5,583,990 A * 12/1996 Birrittella ............... H04L 45/10
711/170

(Continued)

FOREIGN PATENT DOCUMENTS

CN        103701710 A    4/2014
CN        103746927 A    4/2014
(Continued)

OTHER PUBLICATIONS

Yi Xu et al, Simple Virtual Channel Allocation for High Throughput and High FrequencyOn-Chip Routers, HPCA—16 2010 the Sixteenth International Symposium on High-Performance Computer Architecture, 11 pages.

(Continued)

*Primary Examiner* — Melanie Jagannathan
(74) *Attorney, Agent, or Firm* — HUAWEI TECHNOLOGIES CO., LTD.

(57) ABSTRACT

This application provides a virtual channel setting method and the method includes: a' receiving device receives a first data packet of a first data flow from a sending device, where the first data packet includes an identifier of a first virtual channel corresponding to the first data flow; the receiving device selects a second virtual channel for the first data flow from a first virtual channel group corresponding to the first data flow, where the second virtual channel is different from the first virtual channel; and the receiving device sends an acknowledgement packet to the sending device, where the acknowledgement packet includes an identifier of the second virtual channel, and the second virtual channel is used by the sending device to update a virtual channel corresponding to the first data flow.

19 Claims, 5 Drawing Sheets

(56) References Cited

U.S. PATENT DOCUMENTS

| | | | | |
|---|---|---|---|---|
| 5,852,601 | A * | 12/1998 | Newman | H04L 12/5602 370/410 |
| 5,920,705 | A * | 7/1999 | Lyon | H04L 12/5601 709/240 |
| 6,788,691 | B1 * | 9/2004 | Caves | H04L 12/5601 370/395.64 |
| 7,974,278 | B1 * | 7/2011 | MacAdam | H04L 49/65 370/389 |
| 9,544,120 | B2 * | 1/2017 | Scholten | H04B 7/15507 |
| 10,602,528 | B2 * | 3/2020 | Gan | H04L 69/28 |
| 10,628,547 | B1 * | 4/2020 | Swarbrick | G06F 30/347 |
| 11,700,211 | B2 * | 7/2023 | Salinger | H04L 41/0896 725/109 |
| 2001/0033552 | A1 * | 10/2001 | Barrack | H04L 49/30 370/282 |
| 2005/0063394 | A1 * | 3/2005 | Ko | H04L 49/254 370/399 |
| 2007/0110098 | A1 * | 5/2007 | Hart | H04L 47/13 370/464 |
| 2009/0119396 | A1 * | 5/2009 | Kanda | H04Q 11/0005 709/223 |
| 2009/0161683 | A1 * | 6/2009 | Allie | H04W 28/18 370/401 |
| 2010/0146170 | A1 * | 6/2010 | Brown | G06F 13/4022 710/105 |
| 2010/0165874 | A1 * | 7/2010 | Brown | G06F 13/4022 370/254 |
| 2011/0149759 | A1 * | 6/2011 | Jollota | H04W 72/02 370/252 |
| 2011/0271002 | A1 * | 11/2011 | Martinez | H04L 65/70 709/233 |
| 2011/0310739 | A1 * | 12/2011 | Aybay | H04L 49/70 370/384 |
| 2014/0201349 | A1 * | 7/2014 | Anantharam | H04L 41/0893 709/223 |
| 2014/0289439 | A1 * | 9/2014 | Mangano | G06F 13/14 710/306 |
| 2015/0264627 | A1 * | 9/2015 | Perdomo | H04W 40/12 370/329 |
| 2015/0304691 | A1 | 10/2015 | Yang et al. | |
| 2017/0105217 | A1 * | 4/2017 | Kwon | H04W 52/245 |
| 2017/0180486 | A1 * | 6/2017 | Mehta | H04L 43/0852 |
| 2017/0339075 | A1 * | 11/2017 | Arad | H04L 49/9084 |
| 2019/0058651 | A1 * | 2/2019 | McDonald | H04L 45/44 |
| 2019/0090149 | A1 * | 3/2019 | Liu | H04W 16/14 |
| 2019/0150150 | A1 * | 5/2019 | Calin | H04W 72/0453 370/329 |
| 2019/0181932 | A1 * | 6/2019 | Jayawardene | H04W 72/046 |
| 2019/0182161 | A1 * | 6/2019 | Ravi | H04L 47/30 |
| 2019/0238453 | A1 * | 8/2019 | Swarbrick | H04L 67/34 |
| 2019/0260879 | A1 * | 8/2019 | Raleigh | H04M 15/83 |
| 2019/0349806 | A1 * | 11/2019 | Nam | H04W 28/0278 |
| 2020/0076742 | A1 * | 3/2020 | McDonald | H04L 47/39 |
| 2020/0304426 | A1 * | 9/2020 | Zhao | H04L 12/66 |
| 2020/0374238 | A1 * | 11/2020 | Momchilov | H04L 47/781 |
| 2021/0144693 | A1 * | 5/2021 | Qu | H04L 1/1896 |
| 2021/0258830 | A1 * | 8/2021 | Baek | H04W 72/569 |
| 2023/0370894 | A1 * | 11/2023 | McHardy | H04W 28/065 |

FOREIGN PATENT DOCUMENTS

| | | |
|---|---|---|
| CN | 103907321 A | 7/2014 |
| CN | 104917694 A | 9/2015 |
| CN | 106330742 A | 1/2017 |
| CN | 106792831 A | 5/2017 |
| CN | 109314666 A | 2/2019 |

OTHER PUBLICATIONS

Yi Xu et al, Simple virtual channel allocation for high throughput and high frequency on-chip routers, High Performance Computer Architecture (HPCA), 2010 IEEE 16th International Symposium On, IEEE, Piscataway, NJ, USA, Jan. 9, 2010, pp. 1-11, XP031640710.

Huawei et al: "The Lossless Network for Data Centers—White Paper", IEEE Draft; 1-17-0006-00-ICNE-THE-LOSSLESS-NETWORK-FOR-DATA-CENTERS-WHITE-PAPER, IEEE-SA Mentor, Piscataway, NJ USA, vol. 802 .1 , Nov. 7, 2017, pp. 1-15, XP068123430.

* cited by examiner

VIRTUAL CHANNEL SETTING METHOD AND APPARATUS FOR DATA FLOW

CROSS-REFERENCE TO RELATED APPLICATIONS

This application is a continuation of International Application No. PCT/CN2020/084548, filed on Apr. 13, 2020, which claims priority to Chinese Patent Application No. 201910309167.9, filed on Apr. 17, 2019. The disclosures of the aforementioned applications are hereby incorporated by reference in their entireties.

TECHNICAL FIELD

This application relates to the field of mobile communication technologies, and in particular, to a virtual channel setting method and apparatus for a data flow.

BACKGROUND

Some high-performance services in a network require lossless packet transmission. An Ethernet pause (Pause) mechanism is a mechanism for preventing packet loss. A basic principle of the mechanism is as follows: When a receiving capacity of a receiving device is lower than a sending capacity of a sending device, the receiving device actively sends a traffic pause signal (Pause frame) to the sending device, to indicate the sending device to suspend sending and wait for a period of time before continuing sending. However, the pause mechanism is targeted for an entire port, and the pause frame causes an entire link to suspend traffic. When a plurality of services share a link, all the services will be interrupted when any service causes link traffic suspension.

To resolve the foregoing problem, a current solution is to create a plurality of virtual channels on one Ethernet link, and one virtual channel corresponds to one service type, that is, a data flow of one service type is sent through one virtual channel. Therefore, when congestion occurs on a virtual channel (that is, congestion occurs in a cache queue corresponding to the virtual channel on a receiving device), traffic of only the virtual channel needs to be suspended independently, so that traffic of another virtual channel is not affected, thereby implementing sharing and isolation of one physical link among a plurality of types of services.

FIG. 1 is a schematic diagram of traffic control based on virtual channels. As an example, one physical link between a sending device and a receiving device is divided into eight virtual channels, one service type corresponds to one virtual channel, and one cache queue on the receiving device corresponds to one virtual channel. For example, when congestion occurs on traffic of the seventh virtual channel, a virtual channel 7 of the receiving device sends a traffic pause signal to a virtual channel 7 of the sending device. After receiving the traffic pause signal, the virtual channel 7 of the sending device suspends sending traffic, and service traffic of other virtual channels is not affected.

A problem in the foregoing method is as follows: When a quantity of data flows of a service type is relatively large, traffic of a virtual channel corresponding to the service type is extremely heavy, and congestion continuously occurs on the virtual channel; and consequently, the data flows cannot be quickly sent or even cannot be sent.

SUMMARY

This application provides a virtual channel setting method and apparatus for a data flow, to resolve a problem that a data flow cannot be quickly sent due to congestion on a virtual channel.

According to a first aspect, this application provides a virtual channel setting method for a data flow, including: A receiving device receives a first data packet of a first data flow from a sending device, where the first data packet includes an identifier of a first virtual channel corresponding to the first data flow; the receiving device selects a second virtual channel for the first data flow from a first virtual channel group corresponding to the first data flow, where the second virtual channel is different from the first virtual channel; and the receiving device sends an acknowledgement packet to the sending device, where the acknowledgement packet includes an identifier of the second virtual channel, and the second virtual channel is used by the sending device to update a virtual channel corresponding to the first data flow. Based on this solution, the receiving device dynamically allocates a virtual channel with a relatively low current congestion degree to the first data flow. Therefore, when the sending device sends the first data flow, a possibility that congestion occurs on the virtual channel can be reduced, so that the first data flow can be quickly sent to the receiving device.

In a possible implementation method, the first data packet includes an identifier of the first data flow; and that the receiving device selects a second virtual channel for the first data flow from a first virtual channel group corresponding to the first data flow includes: The receiving device selects the second virtual channel for the first data flow based on the identifier of the first data flow and the first virtual channel group.

In a possible implementation method, that the receiving device selects a second virtual channel for the first data flow from a first virtual channel group corresponding to the first data flow includes: The receiving device selects the second virtual channel for the first data flow from a second virtual channel group, where the second virtual channel group includes one or more virtual channels whose congestion degrees meet a preset condition in the first virtual channel group. In this solution, one second virtual channel group is first set, and virtual channels in the second virtual channel group are virtual channels with a relatively low congestion degree. Therefore, subsequently a second virtual channel can be directly selected from the second virtual channel group, which can improve selection efficiency and help improve performance.

In a possible implementation method, the second virtual channel group includes at least one virtual channel, and the second virtual channel is any virtual channel in the second virtual channel group.

In a possible implementation method, the receiving device updates the second virtual channel group based on a current congestion degree of a virtual channel in the first virtual channel group. In this solution, the second virtual channel group can be dynamically updated, to help ensure that virtual channels in the second virtual channel group are always some virtual channels with a relatively low congestion degree, thereby helping the receiving device select a virtual channel with a low congestion degree and further reducing an occurrence possibility of congestion.

In a possible implementation method, the second virtual channel is a virtual channel with a lowest congestion degree in the first virtual channel group. In this solution, the receiving device selects the virtual channel with the lowest congestion degree, thereby increasing an occurrence possibility of congestion.

In a possible implementation method, the first data flow is a data flow of a first service type, the virtual channel in the first virtual channel group is a virtual channel in a virtual channel group corresponding to the data flow of the first service type, at least one virtual channel in the first virtual channel group is different from at least one virtual channel in a virtual channel group corresponding to a data flow of a second service type, and the first service type is different from the second service type.

In a possible implementation method, the receiving device maintains a flow virtual channel table, the flow virtual channel table includes at least one entry, one entry corresponds to one data flow, and one entry includes at least the following three fields: an identifier of a data flow, a virtual channel of a data flow, and whether the entry is valid; the flow virtual channel table includes a first entry corresponding to the first data flow, and a virtual channel of a data flow corresponding to the first entry is the second virtual channel; before the receiving device sends the acknowledgement packet to the sending device, the receiving device determines that the first entry corresponding to the first data flow is valid, and obtains the second virtual channel from the first entry; and the receiving device determines that the virtual channel of the data flow corresponding to the first entry is different from the first virtual channel. In this solution, a flow virtual channel table is maintained, so that the receiving device records a virtual channel selected for each data flow, and records whether the virtual channel corresponding to the data flow needs to be updated currently.

In a possible implementation method, an initial state of the first entry is invalid; and before the receiving device determines that the first entry corresponding to the first data flow is valid, and obtains the second virtual channel from the first entry, the method further includes: The receiving device determines that the first data packet meets a preset condition; and the receiving device updates the second virtual channel to the first entry, and sets the first entry to valid.

In a possible implementation method, the receiving device receives a second data packet of the first data flow from the sending device, where the second data packet includes the identifier of the second virtual channel.

In a possible implementation method, if determining that a current congestion degree of the second virtual channel meets the preset condition, the receiving device selects a third virtual channel for the first data flow from the first virtual channel group; the receiving device updates the third virtual channel to the first entry, where the third virtual channel is different from the second virtual channel; and if the first entry is invalid, the receiving device sets the first entry to valid. Based on this solution, a virtual channel corresponding to a data flow in the flow virtual channel table can be dynamically updated, which helps select a virtual channel with a low congestion degree for the data flow.

In a possible implementation method, that the receiving device determines that a current congestion degree of the second virtual channel meets the preset condition includes: The receiving device determines that the congestion degree of the second virtual channel is higher than a first congestion degree threshold; or the receiving device determines that a quantity of times of sending a back pressure packet to the sending device is greater than a threshold of quantity of times of sending a back pressure packet, where the back pressure packet is used to indicate that the congestion degree of the second virtual channel is higher than a second congestion degree threshold.

According to a second aspect, this application provides a virtual channel setting method for a data flow, including: A sending device sends a first data packet of a first data flow to a receiving device, where the first data packet includes an identifier of a first virtual channel corresponding to the first data flow; the sending device receives an acknowledgement packet from the receiving device, where the acknowledgement packet includes an identifier of a second virtual channel, the second virtual channel is a virtual channel in a first virtual channel group corresponding to the first data flow, and the second virtual channel is different from the first virtual channel; and the sending device updates a virtual channel corresponding to the first data flow to the second virtual channel. Based on this solution, the receiving device dynamically allocates a virtual channel with a relatively low current congestion degree to the first data flow. Therefore, when the sending device sends the first data flow, a possibility that congestion occurs on the virtual channel can be reduced, so that the first data flow can be quickly sent to the receiving device.

In a possible implementation method, the second virtual channel is a virtual channel in a second virtual channel group, and the second virtual channel group includes one or more virtual channels whose congestion degrees meet a preset condition in the first virtual channel group.

In a possible implementation method, the second virtual channel group includes at least one virtual channel, and the second virtual channel is any virtual channel in the second virtual channel group.

In a possible implementation method, the second virtual channel is a virtual channel with a lowest congestion degree in the first virtual channel group.

In a possible implementation method, the first data flow is a data flow of a first service type, a virtual channel in the first virtual channel group is a virtual channel in a virtual channel group corresponding to the data flow of the first service type, at least one virtual channel in the first virtual channel group is different from at least one virtual channel in a virtual channel group corresponding to a data flow of a second service type, and the first service type is different from the second service type.

In a possible implementation method, the first data packet is a data packet that meets a preset condition.

In a possible implementation method, after the sending device updates the virtual channel of the first data flow to the second virtual channel, the sending device sends a second data packet of the first data flow to the receiving device, where the second data packet includes an identifier of the second virtual channel.

According to a third aspect, this application provides a virtual channel setting apparatus for a data flow, where the apparatus may be a receiving device, or may be a chip used in a receiving device. The apparatus has a function for implementing each embodiment in the first aspect. The function may be implemented by using hardware, or may be implemented by hardware executing corresponding software. The hardware or software includes one or more modules corresponding to the foregoing function.

According to a fourth aspect, this application provides a virtual channel setting apparatus for a data flow, where the apparatus may be a sending device, or may be a chip used in a sending device. The apparatus has a function for implementing each embodiment in the second aspect. The function may be implemented by using hardware, or may be implemented by hardware executing corresponding software. The hardware or software includes one or more modules corresponding to the foregoing function.

According to a fifth aspect, this application provides a virtual channel setting apparatus for a data flow, including a processor and a memory, where the memory is configured to store computer executable instructions. When the apparatus runs, the processor executes the computer executable instructions stored in the memory, so that the apparatus performs the methods in the foregoing aspects.

According to a sixth aspect, this application provides a virtual channel setting apparatus for a data flow, including: a unit or a means (means) configured to perform steps in the foregoing aspects.

According to a seventh aspect, this application provides a virtual channel setting apparatus for a data flow, including a processor and an interface circuit, where the processor is configured to communicate with another apparatus by using the interface circuit, and perform the methods in the foregoing aspects. One or more processors are included.

According to an eighth aspect, this application provides a virtual channel setting apparatus for a data flow, including a processor, configured to be connected to a memory, and configured to invoke a program stored in the memory to perform the methods in the foregoing aspects. The memory may be located in the apparatus, or may be located outside the apparatus. In addition, one or more processors are included.

According to a ninth aspect, this application further provides a computer-readable storage medium, and the computer-readable storage medium stores instructions. When the instructions are run on a computer, the computer is enabled to perform the methods in the foregoing aspects.

According to a tenth aspect, this application further provides a computer program product that includes instructions. When the computer program product is run on a computer, the computer is enabled to perform the methods in the foregoing aspects.

According to an eleventh aspect, this application further provides a chip system, including: a processor, configured to perform the methods in the foregoing aspects.

According to a twelfth aspect, this application further provides a communication system, including a receiving device configured to perform the method according to any implementation method of the first aspect and a sending device configured to perform the method according to any implementation method of the second aspect.

DESCRIPTION OF EMBODIMENTS

To make the objectives, technical solutions, and advantages of this application clearer, the following further describes this application in detail with reference to the accompanying drawings. A specific operation method in a method embodiment may also be applied to an apparatus embodiment or a system embodiment. In the descriptions of this application, unless otherwise specified, "a plurality of" means two or more than two.

Figure 2:
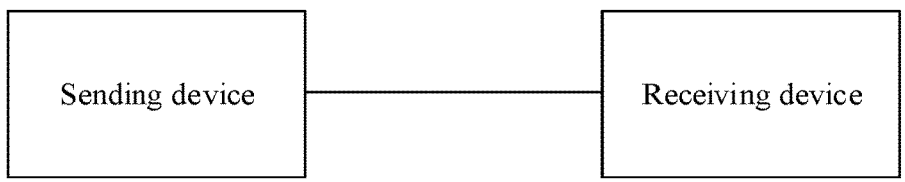
FIG. 2 is a schematic diagram of a network architecture applicable to this application.

FIG. 2 is a schematic diagram of a network architecture applicable to this application. The network architecture includes a sending device and a receiving device. The sending device and the receiving device in this application each may be a server or a network adapter in a data center network (such as high-performance computing, high-performance distributed storage, big data, or artificial intelligence), or may be a switch or another device form.

For example, there is a link: device 1→device 2→device 3→device 4, that is, the device 1 sends a data flow to the device 4. The device 1 herein is an initiator of the data flow or a source end of the data flow. The device 1 may be a server or the like. The device 4 herein is a receiver of the data flow or a destination end of the data flow. The device 4 may be a server or the like. The device 2 and the device 3 herein are forwarders of the data flow. The device 2 and the device 3 may be switches, network adapters, or the like. A channel between two adjacent devices in the link may be a virtual channel or a physical channel.

Based on this example, in an embodiment, the sending device shown in FIG. 2 of this application may be the device 1, the receiving device may be the device 2, the device 3, or the device 4, that is, the sending device is always the source end, and the receiving device may be a device of any node except the source end in the link.

Based on this example, in another embodiment, the sending device shown in FIG. 2 of this application may be the device 1, and the receiving device may be the device 4, that is, the sending device is always the source end and the receiving device is always the destination end.

Based on this example, in another embodiment, the sending device shown in FIG. 2 of this application may be the device 1, and the receiving device may be the device 2. Alternatively, the sending device may be the device 2, and the receiving device may be the device 3. Alternatively, the sending device may be the device 3, and the receiving device may be the device 4. That is, the sending device and the receiving device are always two adjacent devices in the link.

It should be noted that the foregoing examples are merely for description, and do not constitute a limitation on the scope of this application.

To facilitate understanding of the solutions of this application, the following explains some nouns or terms in this application.

1. Cache Queue and Virtual Channel

In this application, N virtual channels exist between a sending device and a receiving device, N is greater than 1, N cache queues exist on the sending device, each cache queue on the sending device corresponds to one virtual channel, N cache queues also exist on the receiving device, and each cache on the receiving device corresponds to one virtual channel. That is, there is a one-to-one correspondence among the N cache queues on the sending device, the N cache queues on the receiving device, and the N virtual channels.

The virtual channel may be virtualized from a physical channel, and one physical channel may be virtualized into a plurality of virtual channels.

Figure 1:
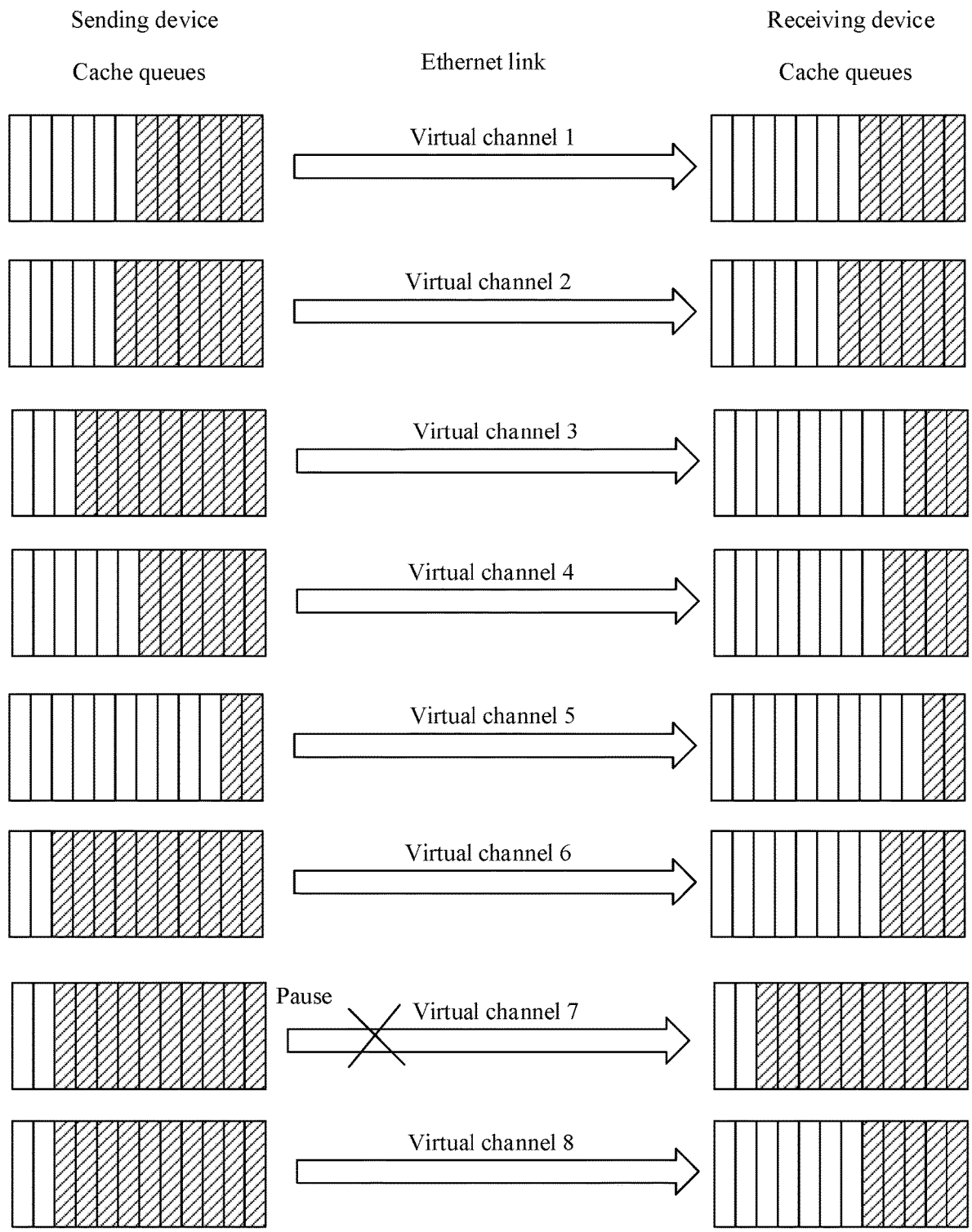
FIG. 1 is a schematic diagram of traffic control based on virtual channels in the conventional technology.

FIG. 1 is used as an example. Eight virtual channels exist between a sending device and a receiving device, eight cache queues exist on the sending device, and eight cache queues exist on the receiving device. Then, the following correspondence exists:

A data flow of a cache queue 1 on the sending device is sent to a cache queue 1 on the receiving device through a virtual channel 1;

a data flow of a cache queue 2 on the sending device is sent to a cache queue 2 on the receiving device through a virtual channel 2;

a data flow of a cache queue 3 on the sending device is sent to a cache queue 3 on the receiving device through a virtual channel 3;

a data flow of a cache queue 4 on the sending device is sent to a cache queue 4 on the receiving device through a virtual channel 4;

a data flow of a cache queue 5 on the sending device is sent to a cache queue 5 on the receiving device through a virtual channel 5;

a data flow of a cache queue 6 on the sending device is sent to a cache queue 6 on the receiving device through a virtual channel 6;

a data flow of a cache queue 7 on the sending device is sent to a cache queue 7 on the receiving device through a virtual channel 7; and a data flow of a cache queue 8 on the sending device is sent to a cache queue 8 on the receiving device through a virtual channel 8.

In this application, one virtual channel being congested refers to a case in which the sending device sends a data flow excessively fast or sends excessive data flows, causing a corresponding cache queue on the receiving device to be full or about to be full. Therefore, a virtual channel being congested may also be understood as a corresponding cache queue on the receiving device being congested. For example, in FIG. 1, congestion occurring on the virtual channel 7 may also be understood as congestion occurring on the cache queue 7 on the receiving device.

In an implementation method, a congestion degree of a virtual channel may be represented by a congestion degree of a cache queue on the receiving device and corresponding to the virtual channel. In addition, a congestion degree of a cache queue may be represented by using a ratio of a quantity of cached data packets in the cache queue to a storage capacity (namely, a total quantity of data packets that can be cached) of the cache queue.

2. Correspondence Among Data Flows, Data Types, and Virtual Channels

In this application, the correspondence among data flows, data types, and virtual channels may be implemented by using the following method 1 or method 2.

Method 1: One data flow corresponds to one or more virtual channels.

FIG. 1 is used as an example. For example, for a data flow 1, the data flow 1 corresponds to four virtual channels (the virtual channel 1 to the virtual channel 4 respectively). Therefore, the sending device may send any data packet of the data flow 1 to the receiving device by using any one of the four virtual channels. For another example, for a data flow 2, the data flow 2 corresponds to three virtual channels (the virtual channel 1 to the virtual channel 3 respectively). Therefore, the sending device may send any data packet of the data flow 2 to the receiving device by using any one of the three virtual channels. For another example, for a data flow 3, the data flow 3 corresponds to three virtual channels (the virtual channel 3 to the virtual channel 5 respectively). Therefore, the sending device may send any data packet of the data flow 3 to the receiving device by using any one of the three virtual channels.

It should be noted that the foregoing data flows may be data flows of a same service type, or may be data flows of different service types. For example, the data flow 1 and the data flow 2 are data flows of a video type, and the data flow 3 is a data flow of a voice type. It may be learned that data flows of different service types may share a virtual channel, for example, the data flow 2 of the video type and the data flow 3 of the voice type share the virtual channel 3.

In addition, virtual channels that can be used by data flows of a same service type may be partly the same. For example, the data flow 1 of the video type cannot use the virtual channel 4, but the data flow 2 of the video type can use the virtual channel 4.

Method 2: One service type corresponds to a plurality of virtual channels, a data flow of one service type corresponds to some or all virtual channels of the plurality of virtual channels, and data flows of different service types respectively correspond to different virtual channels.

For any data flow (referred to as a first data flow), if the first data flow is a data flow of a first service type, virtual channels corresponding to the first data flow are some or all virtual channels in a virtual channel group corresponding to the data flow of the first service type. In addition, at least one virtual channel in the virtual channels corresponding to the first data flow is different from at least one virtual channel in a virtual channel group corresponding to a data flow of a second service type, and the first service type is different from the second service type. Optionally, any virtual channel in the virtual channels corresponding to the first data flow is different from all virtual channels in the virtual channel group corresponding to the data flow of the second service type.

The following uses an example in which any virtual channel in the virtual channels corresponding to the first data flow is different from all the virtual channels in the virtual channel group corresponding to the data flow of the second service type for description.

FIG. 1 is used as an example. For example, a video service type corresponds to the virtual channel 1 to the virtual channel 4, and a voice service type corresponds to the virtual channel 5 to the virtual channel 7, that is, there is no intersection between the virtual channels corresponding to the video service type and the virtual channels corresponding to the voice service type.

For a data flow of the video service type, virtual channels corresponding to the data flow are some or all virtual channels in the virtual channel 1 to the virtual channel 4. For example, for the data flow 1 of the video service type, corresponding virtual channels are the virtual channel 1 to the virtual channel 3, indicating that the sending device may send any data packet of the data flow 1 to the receiving device by using any one of the three virtual channels. For another example, for the data flow 2 of the video service type, corresponding virtual channels are the virtual channel 1 to the virtual channel 4, indicating that the sending device may send any data packet of the data flow 2 to the receiving device by using any one of the four virtual channels.

For a data flow of the voice service type, virtual channels corresponding to the data flow are some or all virtual channels in the virtual channel 5 to the virtual channel 7. For example, for the data flow 3 of the voice service type, corresponding virtual channels are the virtual channel 5 and the virtual channel 6, indicating that the sending device may send any data packet of the data flow 3 to the receiving device by using any one of the two virtual channels. For another example, for a data flow 4 of the voice service type, corresponding virtual channels are the virtual channel 5 to the virtual channel 7, indicating that the sending device may send any data packet of the data flow 4 to the receiving device by using any one of the three virtual channels.

In an implementation method, all virtual channels corresponding to a same service type are set to a same priority, and virtual channels corresponding to different service types are set to different priorities. For example, if all virtual channels corresponding to the video service type are set to a priority 1, priorities of data flows of the video service type are the same, that is, all priorities are 1. For another example, if all virtual channels corresponding to the voice service type are set to a priority 2, priorities of data flows of the voice service type are the same, that is, all priorities are 2.

It should be noted that, regardless of the foregoing method 1 or method 2, in this application, one data flow may correspond to one or more virtual channels.

3. First Virtual Channel Group and Second Virtual Channel Group

In this application, a set of all virtual channels corresponding to any data flow (referred to as a first data flow in this application) is referred to as a first virtual channel group. For example, for the data flow 1, if all virtual channels corresponding to the data flow 1 are the virtual channel 1 to the virtual channel 4, a first virtual channel group corresponding to the data flow 1 includes: {virtual channel 1, virtual channel 2, virtual channel 3, virtual channel 4}. In this application, a first virtual channel group corresponding to a data flow refers to a set of all available virtual channels corresponding to the data flow.

In this application, a set of one or more virtual channels whose congestion degrees meet a preset condition in a first virtual channel group corresponding to any data flow is referred to as a second virtual channel group.

For example, the preset condition herein may be that a congestion degree is the lowest, that is, a set of one or more virtual channels with a lowest congestion degree in the first virtual channel group is referred to as a second virtual channel group. For example, for the data flow 1, if the first virtual channel group corresponding to the data flow 1 includes {virtual channel 1, virtual channel 2, virtual channel 3, virtual channel 4}, and a quantity of virtual channels included in the second virtual channel group is preset to be equal to 2, if the virtual channel 3 and the virtual channel 4 are two virtual channels with a lowest congestion degree in the first virtual channel group, the second virtual channel group includes {virtual channel 3, virtual channel 4}.

For another example, the preset condition herein may alternatively be that the congestion degree is less than a preset threshold, that is, a set of one or more virtual channels with a congestion degree less than the preset threshold in the first virtual channel group is referred to as the second virtual channel group.

For another example, the preset condition herein may alternatively be that the congestion degree is less than a preset threshold and the congestion degree is not the minimum, that is, a set of one or more virtual channels with a congestion degree less than the preset threshold and not the minimum in the first virtual channel group is referred to as the second virtual channel group. In this method, a virtual channel with a minimum congestion degree is excluded from the second virtual channel group, because the virtual channel with a minimum congestion degree may be reserved for another purpose, for example, used for sending a specific data flow.

It should be noted that the second virtual channel group may be dynamically updated, for example, may be periodically updated. Specifically, the receiving device may update the second virtual channel group based on a current congestion degree of a virtual channel in the first virtual channel group. That is, the congestion degree of the virtual channel in the first virtual channel group changes in real time. Therefore, when a period arrives, the receiving device may update the second virtual channel group based on the current congestion degree of the virtual channel in the first virtual channel group.

The following describes a virtual channel setting method for a data flow provided in this application, to resolve the problem in the conventional technology mentioned in the background.

Figure 3:
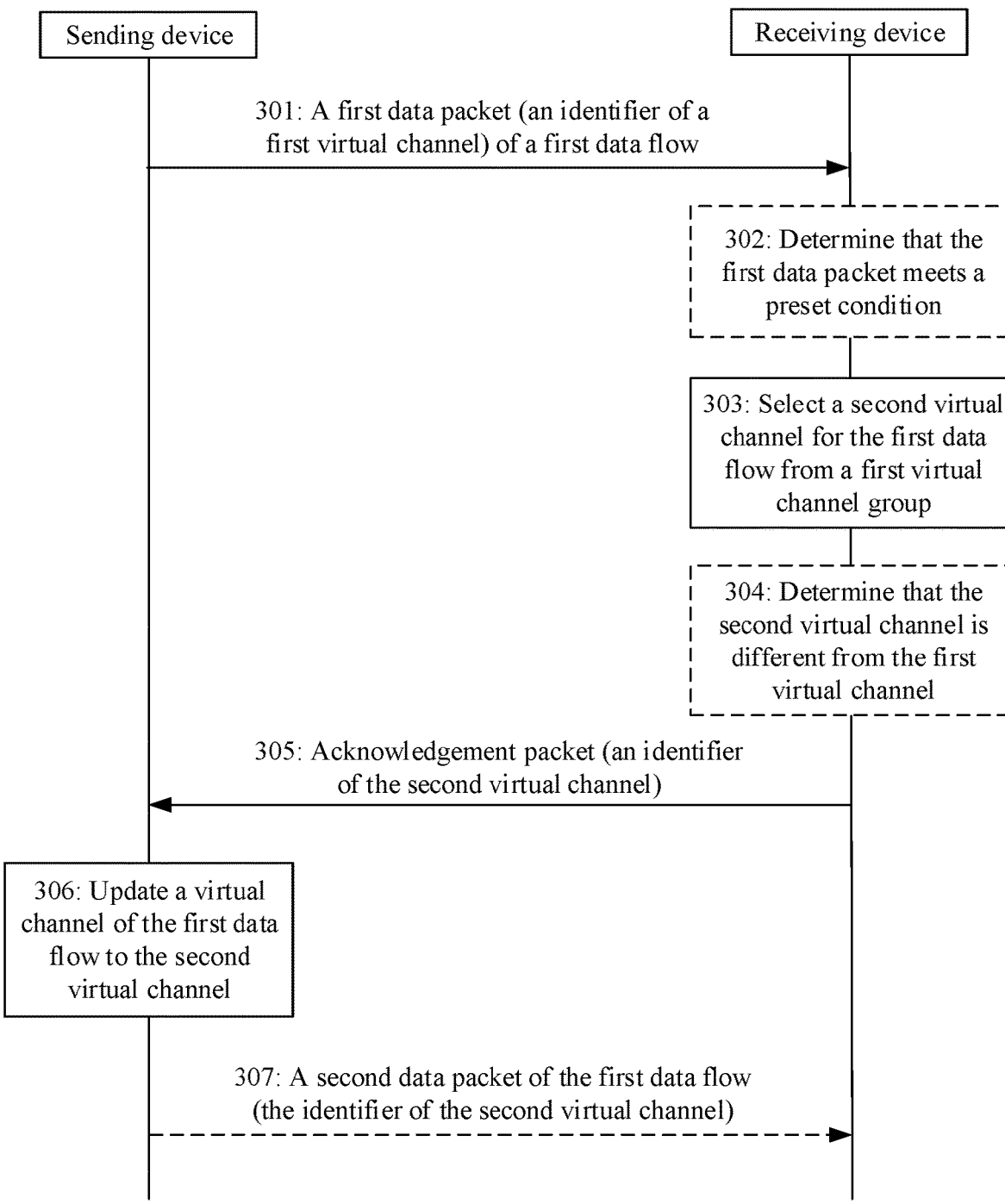
FIG. 3 is a schematic flowchart of a virtual channel setting method for a data flow according to this application.

FIG. 3 is a schematic flowchart of a virtual channel setting method for a data flow according to this application. This embodiment is described for any data flow (referred to as a first data flow). The first data flow corresponds to a first virtual channel group. The first virtual channel group includes at least two virtual channels, which are respectively a first virtual channel and a second virtual channel, and the second virtual channel is different from the first virtual channel. A second virtual channel group corresponding to the first data flow is a subset or a proper subset of the first virtual channel group.

The method includes the following steps:

Step 301: A sending device sends a first data packet of a first data flow to a receiving device. Correspondingly, the receiving device may receive the first data packet of the first data flow.

The first data packet is any data packet of the first data flow. Specifically, the first data packet may be the $1^{st}$ data packet of the first data flow, or may be a subsequent data packet.

The first data packet includes an identifier of a first virtual channel corresponding to the first data flow. The first virtual channel refers to a virtual channel currently used by the first data flow.

Step 303: The receiving device selects a second virtual channel for the first data flow from a first virtual channel group corresponding to the first data flow.

The following provides different implementation methods for selecting the second virtual channel for the first data flow.

Method 1: Use a virtual channel with a lowest congestion degree in the first virtual channel group as the selected second virtual channel.

Method 2: Use a virtual channel with a lowest congestion degree in a second virtual channel group as the selected second virtual channel.

Method 3: Use any virtual channel in a second virtual channel group as the selected second virtual channel.

Because virtual channels in the second virtual channel group are virtual channels with a relatively low congestion degree, selecting any virtual channel directly from the second virtual channel group as the second virtual channel may make implementation simpler.

Method 4: Select the second virtual channel for the first data flow based on an identifier of the first data flow (for example, may be 5-tuple information) and the second virtual channel group.

The method is a method for simultaneously selecting second virtual channels for a plurality of data flows. For example, the receiving device needs to simultaneously select second virtual channels for a plurality of different data flows (the data flows may be data flows of a same service type or may be data flows of different service types), and the receiving device may allocate the data flows to different virtual channels in the second virtual channel group based on identifiers of the data flows and the second virtual channel group to implement uniform allocation, so as to avoid allocating the second virtual channels corresponding to the plurality of data flows to one or more specific virtual channels simultaneously, causing the one or more specific virtual channels to be congested.

The following describes the foregoing method 1 to method 4 with reference to specific examples.

For example, in FIG. 1, the first virtual channel group corresponding to the first data flow includes: {virtual channel 1, virtual channel 2, virtual channel 3, virtual channel 4}, where congestion degree of the virtual channel 1>congestion degree of the virtual channel 2>congestion degree of the virtual channel 3>congestion degree of the virtual channel 4, and the second virtual channel group includes: {virtual channel 3, virtual channel 4}.

In step 303, if the foregoing method 1 is used, the receiving device selects the second virtual channel from the first virtual channel group, that is, selects the virtual channel 4 with a lowest congestion degree from the virtual channel 1, the virtual channel 2, the virtual channel 3, and the virtual channel 4 as the second virtual channel, that is, the second virtual channel is the virtual channel 4.

In step 303, if the foregoing method 2 is used, the receiving device selects the second virtual channel from the second virtual channel group, that is, selects the virtual channel 4 with a lower congestion degree from the virtual channel 3 and the virtual channel 4 as the second virtual channel, that is, the second virtual channel is the virtual channel 4.

In step 303, if the foregoing method 3 is used, the receiving device selects any virtual channel from the second virtual channel group, that is, selects any virtual channel from the virtual channel 3 and the virtual channel 4 as the second virtual channel. Therefore, the second virtual channel is the virtual channel 3 or the virtual channel 4.

In step 303, if the foregoing method 4 is used, and a second virtual channel needs to be selected for each of two data flows (respectively referred to as a first data flow and a second data flow), the receiving device selects a second virtual channel for the first data flow based on the identifier of the first data flow and the first virtual channel group, and selects a second virtual channel for the second data flow based on an identifier of the second data flow and the first virtual channel group. For example, selection may be performed by using a hash function method, so that virtual channels selected for different data flows are as distributed as possible. For example, the virtual channel selected by the receiving device for the first data flow is the virtual channel 3, and the virtual channel selected for the second data flow is the virtual channel 4.

Step 305: The receiving device sends an acknowledgement packet to the sending device. Correspondingly, the sending device may receive the acknowledgement packet.

The acknowledgement packet includes an identifier of the second virtual channel, and the second virtual channel is used to update a virtual channel corresponding to the first data flow on the sending device.

Step 306: The sending device updates the virtual channel of the first data flow to the second virtual channel.

Specifically, the sending device updates the virtual channel of the first data flow from the first virtual channel to the second virtual channel.

In the foregoing embodiment, the receiving device dynamically allocates a virtual channel with a relatively low current congestion degree to the first data flow. Therefore, when the sending device sends the first data flow, a possibility that congestion occurs on the virtual channel can be reduced, so that the first data flow can be quickly sent to the receiving device.

Optionally, after step 306, the method further includes step 307.

Step 307: The sending device sends a second data packet of the first data flow to the receiving device. Correspondingly, the receiving device may receive the second data packet of the first data flow.

The second data packet includes the identifier of the second virtual channel. Therefore, the receiving device caches a subsequent data packet of the first data flow to a cache queue corresponding to the second virtual channel.

It should be noted that the second data packet may be the $1^{st}$ data packet after the first data packet, or may be a data packet following a plurality of data packets after the first data packet. This is because the sending device may continuously send a plurality of data packets (including the first data packet) of the first data flow at a time, where each data packet includes an identifier of a first virtual channel, and before updating the virtual channel, the sending device may further send a plurality of data packets of the first data flow, and identifiers of virtual channels included in the data packets are also the identifier of the first virtual channel.

In a possible implementation method, after step 301 and before step 303, the method further includes step 302.

Step 302: The receiving device determines that the first data packet meets a preset condition.

For example, meeting the preset condition herein may be that the first data packet is the $1^{st}$ data packet of the first data flow. That is, only when receiving the $1^{st}$ data packet of the first data flow, the receiving device performs the foregoing solution of reselecting a virtual channel for the first data flow.

For another example, meeting the preset condition herein may alternatively be that the first data packet is a Kth packet of the first data flow, and K is a preset integer greater than 1. For example, when K is preset to 100, it indicates that when receiving the 100th data packet of the first data flow, the receiving device triggers execution of the foregoing solution of reselecting a virtual channel for the first data flow. Based on this solution, when a quantity of data packets of the first data flow is relatively large, that is, K data packets are reached, the receiving device considers that it is necessary to select a virtual channel with a relatively low congestion degree for the first data flow, and therefore triggers execution of the foregoing virtual channel selection procedure.

In a possible implementation method, after step 303 and before step 305 (in this case, step 302 may be included, or step 302 may not be included), the method may further include step 304.

Step 304: The receiving device determines that the second virtual channel is different from the first virtual channel.

That is, only when determining that the second virtual channel is different from the first virtual channel, the receiving device adds the identifier of the second virtual channel to the acknowledgement packet. Otherwise, the acknowledgement packet in step 305 is a common acknowledgement packet, and does not carry the identifier of the second virtual channel. Therefore, the sending device does not need to perform step 306. Correspondingly, the second data packet in step 307 still carries the identifier of the first virtual channel.

Figure 4:
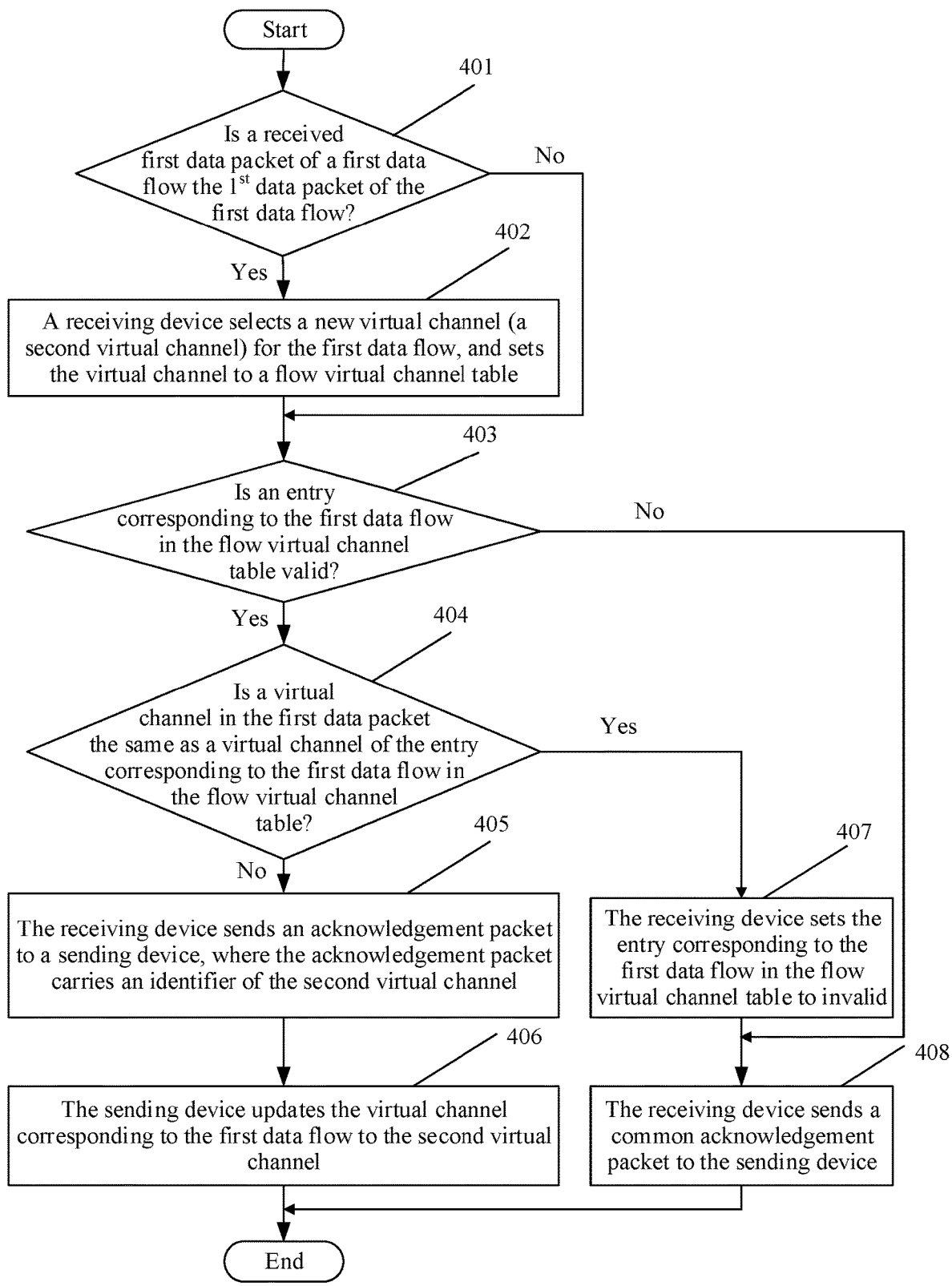
FIG. 4 is a schematic flowchart of another virtual channel setting method for a data flow according to this application.

With reference to FIG. 4, the following provides a specific implementation method. FIG. 4 is a schematic flowchart of another virtual channel setting method for a data flow according to this application.

One flow virtual channel table is maintained in a receiving device, the flow virtual channel table includes one or more entries, one entry corresponds to one data flow, and different entries correspond to different data flows. One entry includes at least three fields: an identifier of a data flow, a virtual channel of a data flow, and whether the entry is valid. In an initial state, each entry in the low virtual channel table is set to invalid, that is, the field "whether the entry is valid" in each entry is set to "invalid", and the field "virtual channel of a data flow" in each entry is set to empty or other invalid information.

That is, any data flow (referred to as a first data flow) is used as an example. In the initial state, the flow virtual channel table includes an identifier of the first data flow, and a virtual channel corresponding to the first data flow is set to empty or other invalid information. An entry corresponding to the first data flow is invalid, that is, the virtual channel corresponding to the first data flow cannot be used to update current virtual channel of the first data flow.

Table 1 shows the initial state of the flow virtual channel table.

TABLE 1

| Initial state of the flow virtual channel table | | |
|---|---|---|
| Identifier of a data flow (flow) | Virtual channel of the data flow | Whether an entry is valid |
| flow ID 1 | Empty | Invalid |
| flow ID 2 | Empty | Invalid |
| flow ID 3 | Empty | Invalid |
| ... | ... | ... |
| flow ID n | Empty | Invalid |

The method includes the following steps:

Step 401: A receiving device receives a first data packet of a first data flow, and determines whether the received first data packet of the first data flow is the 1$^{st}$ data packet of the first data flow. If yes, the receiving device performs step 402; or if no, the receiving device performs step 403.

The first data packet of the first data flow herein includes an identifier of a first virtual channel, and the first virtual channel is a virtual channel currently used by the data flow.

This embodiment is described by using an example in which that the first data packet of the first data flow meets a preset condition is as follows: The first data packet is the 1$^{st}$ data packet of the first data flow.

Step 402: The receiving device selects a new virtual channel (referred to as a second virtual channel) for the first data flow, and sets the virtual channel to a flow virtual channel table.

The first data packet is the 1$^{st}$ data packet of the first data flow, and the first virtual channel carried in the first data packet is an initial virtual channel corresponding to the first data flow. For example, if an initial virtual channel corresponding to each data flow is preconfigured as a virtual channel X (for example, X=1), an identifier of the virtual channel carried in the first data packet is an identifier of the virtual channel X.

After determining that the first data packet is the 1$^{st}$ data packet of the first data flow, the receiving device reselects a new virtual channel (namely, the second virtual channel) for the first data flow. For a specific method for selecting the new virtual channel, reference may be made to the description of the embodiment in FIG. 3 (namely, a specific method for selecting the second virtual channel in FIG. 3).

For example, for a data flow 1 (a data flow indicated by flow ID 1), an initial virtual channel is a virtual channel X (the virtual channel may be referred to as a first virtual channel), and the new virtual channel selected in step 402 is a virtual channel A (for example, A=3). Then, the receiving device updates the virtual channel A (also referred to as a second virtual channel) to an entry corresponding to the data flow 1 in the flow virtual channel table, and sets the entry to valid.

Table 1 is updated to obtain Table 2, where Table 2 is a flow virtual channel table obtained after the entry corresponding to the data flow 1 is updated.

TABLE 2

| Flow virtual channel table obtained after the entry corresponding to the data flow 1 is updated | | |
|---|---|---|
| Identifier of a data flow (flow) | Virtual channel of a data flow | Whether the entry is valid |
| flow ID 1 | A | Valid |
| flow ID 2 | Empty | Invalid |
| flow ID 3 | Empty | Invalid |
| ... | ... | ... |
| flow ID n | Empty | Invalid |

Similarly, if the 1$^{st}$ data packet of another data flow also arrives at the receiving device, the receiving device may also correspondingly update an entry of the another data flow in the flow virtual channel table. For example, Table 3 is an updated flow virtual channel table obtained by updating entries respectively corresponding to the data flow 1 and a data flow 2, where a virtual channel of the data flow 2 is updated to a virtual channel B (for example, B=5).

TABLE 3

| Flow virtual channel table obtained after the entries respectively corresponding to the data flow 1 and the data flow 2 are updated | | |
|---|---|---|
| Identifier of a data flow (flow) | Virtual channel of a data flow | Whether the entry is valid |
| flow ID 1 | A | Valid |
| flow ID 2 | B | Valid |
| flow ID 3 | Empty | Invalid |
| ... | ... | ... |
| flow ID n | Empty | Invalid |

Step 403: The receiving device determines whether an entry corresponding to the first data flow in the flow virtual channel table is valid. If the entry is valid, the receiving device performs step 404; or if the entry is invalid, the receiving device performs step 408.

Specifically, if determining that the entry corresponding to the first data flow in the flow virtual channel table is valid, the receiving device obtains the virtual channel (namely, the second virtual channel) corresponding to the first data flow from the flow virtual channel table, and proceeds to step 404. If determining that the entry corresponding to the first data flow in the flow virtual channel table is invalid, the receiving device proceeds to step 408.

When it is determined that the received first data packet is the 1$^{st}$ data packet of the first data flow in step 403, step 402 is performed. Therefore, the entry corresponding to the first data flow in the flow virtual channel table is definitely valid, and therefore, step 404 is performed.

When it is determined that the received first data packet is not the 1$^{st}$ data packet of the first data flow in step 403, step 402 is not performed and step 403 is performed. In this case, the entry corresponding to the first data flow in the flow virtual channel table may be valid or may be invalid.

Step 404: The receiving device determines whether the first virtual channel in the first data packet is the same as the virtual channel of the entry corresponding to the first data flow in the flow virtual channel table. If not the same, the receiving device performs step 405; or if the same, the receiving device performs step 407.

The receiving device obtains an identifier of the virtual channel corresponding to the entry (namely, a first entry) corresponding to the first data flow from the flow virtual channel table, that is, an identifier of the second virtual channel, and then compares the second virtual channel with the first virtual channel.

For the 1$^{st}$ data packet of the first data flow, the 1$^{st}$ data packet of the data flow 1 is used as an example, and the entry corresponding to the data flow 1 in the flow virtual channel table is valid (refer to Table 2 or Table 3). In addition, if a virtual channel in the received 1$^{st}$ data packet is different from a virtual channel in the entry corresponding to the data flow 1 in the flow virtual channel table, step 405 is performed. Certainly, for the 1$^{st}$ data packet, it is also possible that the virtual channel reselected for the first data flow in step 402 is exactly the same as the initial virtual channel of the first data flow (that is, the selected second virtual channel is the same as the first virtual channel). In this case, step 407 is performed after step 404.

Step 405: The receiving device sends an acknowledgement packet to the sending device, where the acknowledgement packet carries the identifier of the second virtual channel.

For example, for the 1$^{st}$ data packet of the first data flow, the receiving device adds the identifier of the second virtual channel to the acknowledgement packet sent for the 1$^{st}$ data packet. Certainly, for a non-1$^{st}$ data packet of the first data flow, if the receiving device also selects the second virtual channel, the acknowledgement packet also carries the identifier of the second virtual channel.

Step 406: The sending device updates the virtual channel corresponding to the first data flow to the second virtual channel.

Step 407: The receiving device sets the entry corresponding to the first data flow in the flow virtual channel table to invalid.

The following describes different cases in which step 407 is performed and an effect brought after step 407 is performed.

Case 1: The receiving device receives the 1$^{st}$ data packet of the first data flow, and the selected second virtual channel is the same as the first virtual channel.

In this case, it is equivalent to that the virtual channel of the first data flow is already a relatively optimal virtual channel. Therefore, no update is required, or it is understood that the virtual channel of the first data flow remains unchanged, that is, acknowledgement of the virtual channel used by the first data flow is completed. Therefore, the entry corresponding to the first data flow in the flow virtual channel table is set to invalid, that is, a virtual channel does not need to be selected subsequently for the first data flow.

Case 2: The receiving device receives the 1$^{st}$ data packet of the first data flow, and the selected second virtual channel is different from the first virtual channel.

In this case, step 405 is performed, that is, the receiving device notifies, by using the acknowledgement packet, the sending device to update the virtual channel. Specifically, this case is further divided into the following two cases.

Case 2.1: The sending device receives the acknowledgement packet and obtains the identifier of the new virtual channel (namely, the identifier of the second virtual channel) in the acknowledgement packet, to update the virtual channel (that is, updating from the first virtual channel to the second virtual channel).

In this case, when the sending device sends a subsequent data packet (referred to as a second data packet) of the first data flow, the second data packet carries the identifier of the second virtual channel. In this case, the entry corresponding to the first data flow in the flow virtual channel table is still valid. Therefore, for the second data packet, step 401, step 403, and step 404 are performed, and step 407 is performed after step 404.

Case 2.2: The sending device does not receive the acknowledgement packet or fails to correctly parse the acknowledgement packet, and therefore, cannot complete updating of the virtual channel (that is, the sending device keeps the virtual channel as the first virtual channel).

In this case, when the sending device sends a subsequent data packet (referred to as a second data packet) of the first data flow, the second data packet still carries an identifier of a virtual channel before updating (namely, the identifier of the first virtual channel). In this case, the entry corresponding to the first data flow in the flow virtual channel table is still valid. Therefore, for the second data packet, step 401, step 403, and step 404 are performed, and step 405 is performed after step 404.

It can be learned from the foregoing analysis that, only when the initial virtual channel of the sending device is the same as the virtual channel selected by the receiving device, or after the sending device performs updating based on the new virtual channel allocated by the receiving device, the receiving device performs step 407. Therefore, a virtual channel of each data flow is updated only once, and the virtual channel is a relatively optimal virtual channel considered by the receiving device. Therefore, a proper virtual channel is allocated to the data flow.

In an implementation method, the virtual channel of the first data flow in the flow virtual channel table may alternatively be dynamically updated. For example, in the flow virtual channel table, if a virtual channel currently corresponding to the first data flow is the second virtual channel, when determining that a current congestion degree of the second virtual channel meets a preset condition, the receiving device selects a new virtual channel (referred to as a third virtual channel) for the first data flow from a first virtual channel group corresponding to the first data flow, and updates the third virtual channel to the entry corresponding to the first data flow in the flow virtual channel table. The third virtual channel is different from the second virtual channel, and a congestion degree of the third virtual channel is lower than or equal to the congestion degree of the second virtual channel.

That the receiving device determines that a current congestion degree of the second virtual channel meets a preset condition includes:

Method 1: The receiving device determines that the congestion degree of the second virtual channel is higher than a first congestion degree threshold.

That is, as long as the congestion degree of the second virtual channel is higher than the preset first congestion degree threshold, it is considered that the virtual channel is relatively congested, and a virtual channel may be reselected for the first data flow.

A congestion degree of a virtual channel may be represented by a congestion degree of a cache queue corresponding to the virtual channel on the receiving device.

Method 2: The receiving device determines that a quantity of times of sending a back pressure packet to the sending device is greater than a threshold of quantity of times of sending a back pressure packet, where the back pressure packet is used to indicate that the congestion degree of the second virtual channel is higher than a second congestion degree threshold.

In the method, whenever the receiving device determines that the congestion degree of the virtual channel corresponding to the first data flow is higher than the preset second congestion degree threshold, the receiving device sends a back pressure packet (for example, a back pressure frame or a pause frame) to the sending device, to notify the sending device that currently the second virtual channel is relatively congested. When the quantity of times of sending the back pressure packet by the receiving device is greater than the preset threshold of quantity of times of sending a back pressure packet, the receiving device is triggered to reselect a new virtual channel (namely, the third virtual channel) for the first data flow, and update the third virtual channel to the flow virtual channel table. In an implementation method, the quantity of times of sending the back pressure packet herein refers to a quantity of times of sending the back pressure packet collected within preset duration. That is, method 2 may be understood as follows: The receiving device determines that the quantity of times of sending the back pressure packet to the sending device is greater than the threshold of quantity of times of sending a back pressure packet, where the back pressure packet is used to indicate that the congestion degree of the second virtual channel is higher than the second congestion degree threshold.

Based on the foregoing implementation method, when receiving the $1^{st}$ data packet of a data flow, the receiving device may set an entry corresponding to the data flow in the flow virtual channel table, or may reselect a new virtual channel for the data flow when a virtual channel update period of the data flow arrives, and then update the new virtual channel to the entry corresponding to the data flow in the flow virtual channel table. Certainly, if a virtual channel of the data flow in the flow virtual channel table is the same as the selected new virtual channel, no update is required. In addition, it should be noted that if it is found in the updated flow virtual channel table that the field "virtual channel of a data flow" is currently set to "invalid", the field further needs to be set to "valid".

In this method, a virtual channel may be updated for a plurality of times for a data flow, which helps ensure that the virtual channel of the data flow is always in a relatively optimal state (namely, a congestion degree of the virtual channel is relatively low).

Step 408: The receiving device sends a common acknowledgement packet to the sending device. Correspondingly, the sending device may receive the acknowledgement packet.

The common acknowledgement packet is a packet that does not include the new virtual channel.

According to the foregoing embodiment, one flow virtual channel table is used to allocate and update virtual channels to one or more data flows, so that relatively optimal virtual channels are allocated to different data flows.

It should be noted that the receiving device may set a virtual channel for one data flow at a time based on the embodiment in FIG. 4, or may set virtual channels for a plurality of data flows at a time based on the embodiment in FIG. 4. In addition, the receiving device may update a virtual channel of a data flow when receiving the $1^{st}$ data packet of the data flow, or may update the virtual channel of the data flow when receiving a subsequent data packet of the data flow.

In this embodiment of this application, when receiving a data packet of a data flow for the first time, the receiving device allocates a virtual channel based on the data flow, which can effectively resolve a congestion problem caused by heavy virtual channel traffic. In addition, in a subsequent process of sending and receiving a data packet, the receiving device may further dynamically update the flow virtual channel table based on a back pressure condition of the data flow and a current status of the virtual channel, and when a traffic model changes, a congestion problem caused by heavy virtual channel traffic can still be effectively prevented and alleviated. Therefore, in the method in this application, a virtual channel can be allocated based on a data flow, and a virtual channel of the data flow can be dynamically changed. Compared with the solution in the background, a network resource can be more fully used, and a congestion problem caused by heavy virtual channel traffic can be effectively prevented and alleviated.

The solutions provided in this application are mainly described above from a perspective of interaction between network elements. It may be understood that, to implement the foregoing functions, each network element includes a corresponding hardware structure and/or software module for implementing each function. A person skilled in the art should easily be aware that, in combination with the examples described in the embodiments disclosed in this specification, units and algorithm steps may be implemented by hardware or a combination of hardware and computer software in the present invention. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

Figure 5:
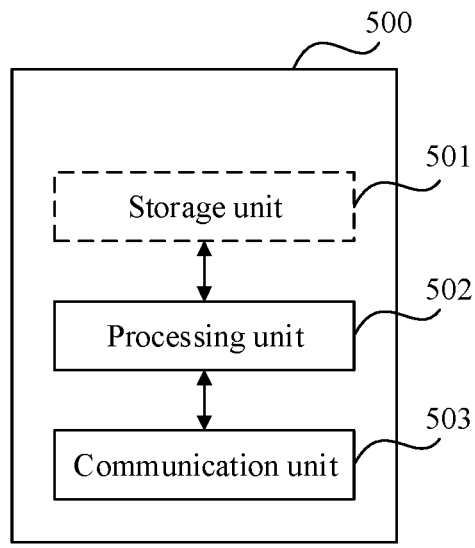
FIG. 5 is a schematic diagram of a virtual channel setting apparatus for a data flow according to this application.

FIG. 5 is a possible example block diagram of a virtual channel setting apparatus for a data flow in this application, and the apparatus 500 may exist in a form of software or hardware. The apparatus 500 may include a processing unit 502 and a communication unit 503. In an implementation, the communication unit 503 may include a receiving unit and a sending unit. The processing unit 502 is configured to control and manage an action of the apparatus 500. The communication unit 503 is configured to support the apparatus 500 in communicating with another network entity. The apparatus 500 may further include a storage unit 501, configured to store program code and data of the apparatus 500.

The processing unit 502 may be a processor or a controller, for example, may be a general-purpose central processing unit (central processing unit, CPU), a general purpose processor, a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or a combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor. The storage unit 501 may be a memory. The communication unit 503 is an interface circuit of the apparatus, and is configured to receive a signal from another apparatus. For example, when the apparatus is implemented in a chip manner, the communication unit 503 is an interface circuit used by the chip to receive a signal from another chip or apparatus, or is an interface circuit used by the chip to send a signal to another chip or apparatus.

The apparatus 500 may be the receiving device in any one of the foregoing embodiments, or may be a chip used in the receiving device. For example, when the apparatus 500 is the receiving device, the processing unit 502 may be a processor, and the communication unit 503 may be a transceiver. Optionally, the transceiver may include a radio frequency circuit, and the storage unit may be, for example, a memory. For example, when the apparatus 500 is the chip used in the receiving device, the processing unit 502 may be a processor, and the communication unit 503 may be an input/output interface, a pin, a circuit, or the like. The processing unit 502 may execute computer executable instructions stored in the storage unit. Optionally, the storage unit is a storage unit in the chip, such as a register or a cache. Alternatively, the storage unit may be a storage unit that is in the receiving device and that is located outside the chip, such as a read-only memory (read-only memory, ROM) or another type of static storage device that can store static information and instructions, or a random access memory (random access memory, RAM).

In an embodiment, the apparatus 500 is a receiving device, and the communication unit 503 includes a sending unit and a receiving unit. The receiving unit is configured to receive a first data packet of a first data flow from a sending device, where the first data packet includes an identifier of a first virtual channel corresponding to the first data flow; the processing unit 502 is configured to select a second virtual channel for the first data flow from a first virtual channel group corresponding to the first data flow, where the second virtual channel is different from the first virtual channel; and the sending unit is configured to send an acknowledgement packet to the sending device, where the acknowledgement packet includes an identifier of the second virtual channel, and the second virtual channel is used by the sending device to update a virtual channel corresponding to the first data flow.

In a possible implementation method, the first data packet includes an identifier of the first data flow; and the processing unit 502 is specifically configured to select the second virtual channel for the first data flow based on the identifier of the first data flow and the first virtual channel group.

In a possible implementation method, the processing unit 502 is specifically configured to select the second virtual channel for the first data flow from a second virtual channel group, where the second virtual channel group includes one or more virtual channels whose congestion degrees meet a preset condition in the first virtual channel group.

In a possible implementation method, the second virtual channel group includes at least one virtual channel, and the second virtual channel is any virtual channel in the second virtual channel group.

In a possible implementation method, the processing unit 502 is further configured to update the second virtual channel group based on a current congestion degree of a virtual channel in the first virtual channel group.

In a possible implementation method, the second virtual channel is a virtual channel with a lowest congestion degree in the first virtual channel group.

In a possible implementation method, the first data flow is a data flow of a first service type, the virtual channel in the first virtual channel group is a virtual channel in a virtual channel group corresponding to the data flow of the first service type, at least one virtual channel in the first virtual channel group is different from at least one virtual channel in a virtual channel group corresponding to a data flow of a second service type, and the first service type is different from the second service type.

In a possible implementation method, the apparatus maintains a flow virtual channel table, the flow virtual channel table includes at least one entry, one entry corresponds to one data flow, and one entry includes at least the following three fields: an identifier of a data flow, a virtual channel of a data flow, and whether the entry is valid; and the flow virtual channel table includes a first entry corresponding to the first data flow, and a virtual channel of a data flow corresponding to the first entry is the second virtual channel; and the processing unit 502 is further configured to: before the sending unit sends the acknowledgement packet to the sending device, determine that the first entry corresponding to the first data flow is valid; and determine that the virtual channel of the data flow corresponding to the first entry is different from the first virtual channel.

In a possible implementation method, an initial state of the first entry is invalid; and the processing unit 502 is further configured to: before determining that the first entry corresponding to the first data flow is valid, and obtaining the second virtual channel from the first entry, determine that the first data packet meets a preset condition; and update the second virtual channel to the first entry, and set the first entry to valid.

In a possible implementation method, the receiving unit is further configured to receive a second data packet of the first data flow from the sending device, where the second data packet includes the identifier of the second virtual channel.

In a possible implementation method, the processing unit 502 is further configured to: if determining that a current congestion degree of the second virtual channel meets the preset condition, select a third virtual channel for the first data flow from the first virtual channel group; update the third virtual channel to the first entry, where the third virtual channel is different from the second virtual channel; and if the first entry is invalid, set the first entry to valid.

In a possible implementation method, the processing unit 502 is specifically configured to: determine that the congestion degree of the second virtual channel is higher than a first congestion degree threshold; or determine that a quantity of times of sending a back pressure packet to the sending device is greater than a threshold of quantity of times of sending a back pressure packet, where the back pressure packet is used to indicate that the congestion degree of the second virtual channel is higher than a second congestion degree threshold.

It may be understood that for a specific implementation process and a corresponding beneficial effect when the apparatus is used in the foregoing virtual channel setting method for a data flow, reference may be made to related descriptions in the foregoing method embodiments, and details are not described herein again.

Figure 6:
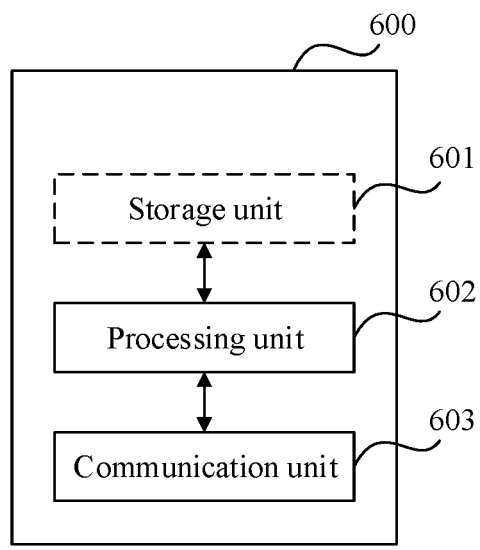
FIG. 6 is a schematic diagram of another virtual channel setting apparatus for a data flow according to this application.

FIG. 6 is a possible example block diagram of a virtual channel setting apparatus for a data flow in this application, and the apparatus 600 may exist in a form of software or hardware. The apparatus 600 may include a processing unit 602 and a communication unit 603. In an implementation, the communication unit 603 may include a receiving unit and a sending unit. The processing unit 602 is configured to control and manage an action of the apparatus 600. The communication unit 603 is configured to support the apparatus 600 in communicating with another network entity. The apparatus 600 may further include a storage unit 601, configured to store program code and data of the apparatus 600.

The processing unit 602 may be a processor or a controller, for example, may be a CPU, a general purpose processor, a DSP, an ASIC, an FPGA, another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor. The storage unit 601 may be a memory. The communication unit 603 is an interface circuit of the apparatus, and is configured to receive a signal from another apparatus. For example, when the apparatus is implemented in a chip manner, the communication unit 603 is an interface circuit used by the chip to receive a signal from another chip or apparatus, or is an interface circuit used by the chip to send a signal to another chip or apparatus.

The apparatus 600 may be the sending device in any one of the foregoing embodiments, or may be a chip used in the sending device. For example, when the apparatus 600 is the sending device, the processing unit 602 may be a processor, and the communication unit 603 may be a transceiver. Optionally, the transceiver may include a radio frequency circuit, and the storage unit may be, for example, a memory. For example, when the apparatus 600 is the chip used in the sending device, the processing unit 602 may be a processor, and the communication unit 603 may be an input/output interface, a pin, a circuit, or the like. The processing unit 602 may execute computer executable instructions stored in the storage unit. Optionally, the storage unit is a storage unit in the chip, such as a register or a cache. Alternatively, the storage unit may be a storage unit that is in the sending device and that is located outside the chip, such as a ROM or another type of static storage device that can store static information and instructions, or a RAM.

In an embodiment, the apparatus 600 is a sending device, and the communication unit 603 includes a sending unit and a receiving unit. The sending unit is configured to send a first data packet of a first data flow to a receiving device, where the first data packet includes an identifier of a first virtual channel corresponding to the first data flow; the receiving unit is configured to receive an acknowledgement packet from the receiving device, where the acknowledgement packet includes an identifier of a second virtual channel, the second virtual channel is a virtual channel in a first virtual channel group corresponding to the first data flow, and the second virtual channel is different from the first virtual channel; and the processing unit 602 is configured to update a virtual channel corresponding to the first data flow to the second virtual channel.

In a possible implementation method, the second virtual channel is a virtual channel in a second virtual channel group, and the second virtual channel group includes one or more virtual channels whose congestion degrees meet a preset condition in the first virtual channel group.

In a possible implementation method, the second virtual channel group includes at least one virtual channel, and the second virtual channel is any virtual channel in the second virtual channel group.

In a possible implementation method, the first data flow is a data flow of a first service type, a virtual channel in the first virtual channel group is a virtual channel in a virtual channel group corresponding to the data flow of the first service type, at least one virtual channel in the first virtual channel group is different from at least one virtual channel in a virtual channel group corresponding to a data flow of a second service type, and the first service type is different from the second service type.

In a possible implementation method, the first data packet is a data packet that is of the first data flow and that meets a preset condition.

In a possible implementation method, the sending unit is further configured to: after the processing unit 602 updates the virtual channel of the first data flow to the second virtual channel, send a second data packet of the first data flow to the receiving device, where the second data packet includes an identifier of the second virtual channel.

In a possible implementation method, the second virtual channel is a virtual channel with a lowest congestion degree in the first virtual channel group. It may be understood that for a specific implementation process and a corresponding beneficial effect when the apparatus is used in the foregoing virtual channel setting method for a data flow, reference may be made to related descriptions in the foregoing method embodiments, and details are not described herein again.

Figure 7:
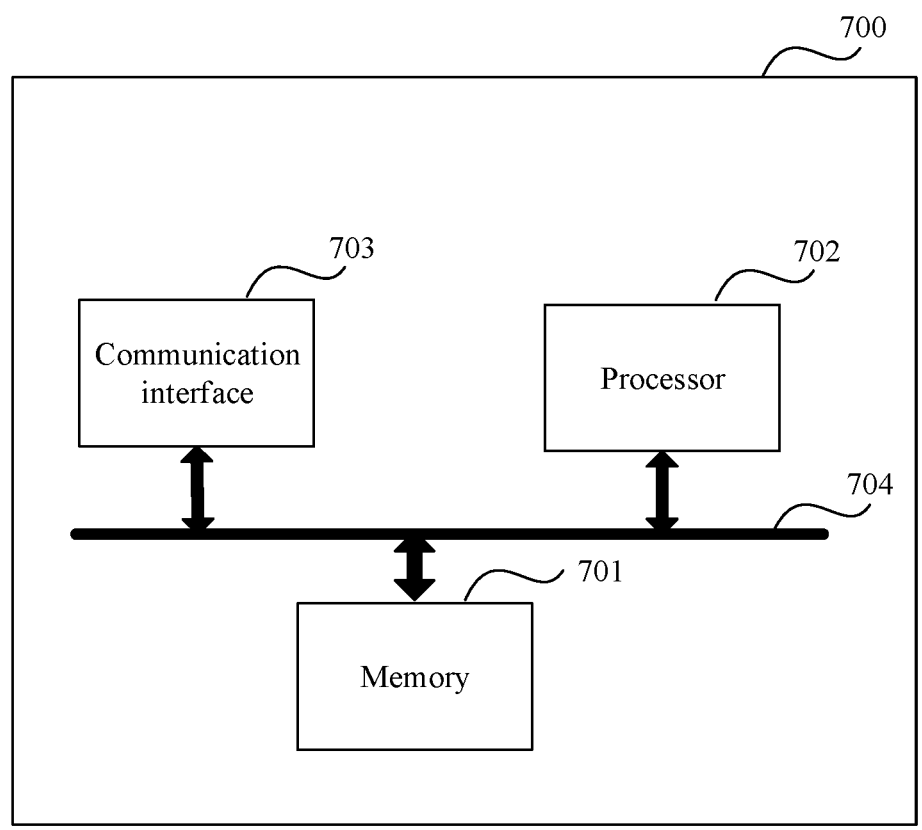
FIG. 7 is a schematic diagram of another virtual channel setting apparatus for a data flow according to this application.

FIG. 7 is a schematic diagram of a virtual channel setting apparatus for a data flow according to this application. The apparatus may be the receiving device or the sending device in the foregoing embodiments. The apparatus 700 includes a processor 702, a communication interface 703, and a memory 701. Optionally, the apparatus 700 may further include a communication line 704. The communication interface 703, the processor 702, and the memory 701 may be connected to each other by using the communication line 704. The communication line 704 may be a peripheral component interconnect (peripheral component interconnect, PCI for short) bus, an extended industry standard architecture (extended industry standard architecture, EISA for short) bus, or the like. The communication line 704 may be classified into an address bus, a data bus, a control bus, and the like. For ease of representation, only one thick line is used to represent the bus in FIG. 7, but this does not mean that there is only one bus or only one type of bus.

The processor 702 may be a CPU, a microprocessor, an ASIC, or one or more integrated circuits configured to control program execution in the solutions of this application.

The communication interface 703 uses any apparatus like a transceiver, and is configured to communicate with another device or a communication network, such as Ethernet, a radio access network (radio access network, RAN), a wireless local area network (wireless local area network, WLAN), or a wired access network.

The memory 701 may be a ROM or another type of static storage device that can store static information and instructions, or a RAM or another type of dynamic storage device that can store information and instructions, or may be an electrically erasable programmable read-only memory (electrically erasable programmable read-only memory, EEPROM), a compact disc read-only memory (compact disc read-only memory, CD-ROM), or other compact disc storage or optical disc storage (including a compressed optical disc, a laser disc, an optical disc, a digital versatile disc, a Blue-ray optical disc, and the like), a magnetic disk storage medium or another magnetic storage device, or any other medium that can carry or store expected program code in a form of instructions or data structures and that can be accessed by a computer, but is not limited thereto. The memory may exist independently, and is connected to the processor by using the communication line 704. Alternatively, the memory may be integrated into the processor.

The memory 701 is configured to store computer executable instructions used to execute the solutions of this application, and the execution is under control of the processor 702. The processor 702 is configured to execute the computer executable instructions stored in the memory 701, to implement the virtual channel setting method for a data flow provided in the foregoing embodiments of this application.

Optionally, the computer executable instructions in this embodiment of this application may also be referred to as application program code. This is not specifically limited in this embodiment of this application.

A person of ordinary skill in the art may understand that various reference numerals such as "first" and "second" in this application are merely used for differentiation for ease of description, and are not used to limit a scope of the embodiments of this application, or represent a sequence. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. "At least one" means one or more. At least two means two or more. "At least one", "any one", or a similar expression means any combination of these items, including a single item or any combination of a plurality of items. For example, at least one of a, b, or c may represent a, b, c, a-b, a-c, b-c, or a-b-c, where a, b, and c may be in a singular or plural form. "A plurality of" means two or more, and another quantifier is similar to this. In addition, an element (element) appearing in singular forms "a", "an" and "the" does not mean "one or only one" but "one or more" unless otherwise specified in the context. For example, "a device" means one or more such devices.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, all or some of the procedures or functions according to the embodiments of this application are generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (Solid State Disk, SSD)), or the like.

The various illustrative logical units and circuits described in the embodiments of this application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may also be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in the embodiments of this application may be directly embedded into hardware, a software unit executed by the processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to the processor, so that the processor can read information from the storage medium and write information to the storage medium. Alternatively, the storage medium may further be integrated into the processor. The processor and the storage medium may be disposed in the ASIC.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although this application is described with reference to specific features and the embodiments thereof, it is clearly that various modifications and combinations may be made to them without departing from the scope of this application. Correspondingly, this specification and the accompanying drawings are merely example description of this application defined by the appended claims, and are considered as any of or all modifications, variations, combinations or equivalents that cover the scope of this application. It is clearly that a person skilled in the art can make various modifications and variations to this application without departing from the scope of this application. In this way, this application is intended to cover these modifications and variations of this application provided that they fall within the scope of the claims of this application and their equivalent technologies.

The invention claimed is:

1. A virtual channel setting method for a data flow, comprising:

receiving, by a receiving device, a first data packet of a first data flow from a sending device, wherein the first data packet comprises an identifier of a first virtual channel corresponding to the first data flow;
selecting, by the receiving device, a second virtual channel for the first data flow from a first virtual channel group corresponding to the first data flow, wherein the second virtual channel is a virtual channel between the sending device and the receiving device and is different from the first virtual channel;
sending, by the receiving device, an acknowledgement packet to the sending device, wherein the acknowledgement packet comprises an identifier of the second virtual channel to indicate the sending device to update a virtual channel corresponding to the first data flow; and
receiving, by the receiving device after sending the acknowledgement packet, a second data packet of the first data flow from the sending device, wherein the second packet comprises the identifier of the second virtual channel.

2. The method according to claim 1, wherein the selecting, by the receiving device, the second virtual channel for the first data flow from the first virtual channel group corresponding to the first data flow comprises:
selecting, by the receiving device, the second virtual channel for the first data flow from a second virtual channel group, wherein
the second virtual channel group comprises one or more virtual channels in the first virtual channel group whose congestion degrees meet a preset condition.

3. The method according to claim 2, wherein the second virtual channel group comprises at least one virtual channel, and the second virtual channel is any virtual channel in the second virtual channel group.

4. The method according to claim 2, wherein the method further comprises:
updating, by the receiving device, the second virtual channel group based on a current congestion degree of a virtual channel in the first virtual channel group.

5. The method according to claim 1, wherein the first data flow is a data flow of a first service type, a virtual channel in the first virtual channel group is a virtual channel in a virtual channel group corresponding to the data flow of the first service type, at least one virtual channel in the first virtual channel group is different from at least one virtual channel in a virtual channel group corresponding to a data flow of a second service type, and the first service type is different from the second service type.

6. The method according to claim 1, wherein the receiving device maintains a flow virtual channel table, the flow virtual channel table comprises at least one entry, one entry corresponds to one data flow, and one entry comprises at least the following three fields: an identifier of a data flow, a virtual channel of a data flow, and whether the entry is valid; and the flow virtual channel table comprises a first entry corresponding to the first data flow, and a virtual channel of a data flow corresponding to the first entry is the second virtual channel; and
before the sending, by the receiving device, the acknowledgement packet to the sending device, the method further comprises:
determining, by the receiving device, that the first entry corresponding to the first data flow is valid; and
determining, by the receiving device, that the virtual channel of the data flow corresponding to the first entry is different from the first virtual channel.

7. The method according to claim 6, wherein an initial state of the first entry is invalid; and
before the determining, by the receiving device, that the first entry corresponding to the first data flow is valid, and obtaining the second virtual channel from the first entry, the method further comprises:
determining, by the receiving device, that the first data packet meets a preset condition; and
updating, by the receiving device, the second virtual channel to the first entry, and setting the first entry to valid.

8. The method according to claim 1, wherein the method further comprises:
receiving, by the receiving device, a second data packet of the first data flow from the sending device, wherein the second data packet comprises the identifier of the second virtual channel.

9. The method according to claim 6, wherein the method further comprises:
determining that a current congestion degree of the second virtual channel meets a preset condition, and in response selecting, by the receiving device, a third virtual channel for the first data flow from the first virtual channel group; and
updating, by the receiving device, the third virtual channel to the first entry, wherein the third virtual channel is different from the second virtual channel; and
if the first entry is invalid, setting, by the receiving device, the first entry to valid.

10. A virtual channel setting method for a data flow, comprising:
sending, by a sending device, a first data packet of a first data flow to a receiving device, wherein the first data packet comprises an identifier of a first virtual channel corresponding to the first data flow;
receiving, by the sending device, an acknowledgement packet from the receiving device, wherein the acknowledgement packet comprises an identifier of a second virtual channel between the sending device and the receiving device, the second virtual channel is a virtual channel in a first virtual channel group corresponding to the first data flow, and the second virtual channel is different from the first virtual channel;
updating, by the sending device, a virtual channel corresponding to the first data flow to the second virtual channel; and
sending, by the sending device in response to the updating virtual channel corresponding to the first data flow, a second data packet of the first data flow to the receiving device, wherein the second data packet comprises the identifier of the second virtual channel.

11. The method according to claim 10, wherein the second virtual channel is a virtual channel in a second virtual channel group, and the second virtual channel group comprises one or more virtual channels in the first virtual channel group, wherein the one or more virtual channels have congestion degrees meeting a preset condition.

12. The method according to claim 11, wherein the second virtual channel group comprises at least one virtual channel, and the second virtual channel is any virtual channel in the second virtual channel group.

13. The method according to claim 10, wherein the first data flow is a data flow of a first service type, a virtual channel in the first virtual channel group is a virtual channel in a virtual channel group corresponding to the data flow of the first service type, at least one virtual channel in the first virtual channel group is different from at least one virtual channel in a virtual channel group corresponding to a data flow of a second service type, and the first service type is different from the second service type.

14. The method according to claim 10, wherein the first data packet is a data packet that is of the first data flow and that meets a preset condition.

15. A virtual channel setting apparatus for a data flow, comprising:
    a receiver, configured to receive a first data packet of a first data flow from a sending device, wherein the first data packet comprises an identifier of a first virtual channel corresponding to the first data flow;
    a processor, configured to select a second virtual channel for the first data flow from a first virtual channel group corresponding to the first data flow, wherein the second virtual channel is a channel between the sending device and the receiving device and is different from the first virtual channel; and
    a transmitter, configured to send an acknowledgement packet to the sending device, wherein the acknowledgement packet comprises an identifier of the second virtual channel to indicate the sending device to update a virtual channel corresponding to the first data flow;
    wherein the receiver is further configured to receive a second data packet of the first data flow from the sending device after the transmitter sends the acknowledgement packet, wherein the second packet comprises the identifier of the second virtual channel.

16. The apparatus according to claim 15, wherein the processor is configured to:
    select the second virtual channel for the first data flow from a second virtual channel group, wherein
    the second virtual channel group comprises one or more virtual channels in the first virtual channel group, wherein the one or more virtual channels have congestion degrees meeting a preset condition.

17. The apparatus according to claim 16, wherein the second virtual channel group comprises at least one virtual channel, and the second virtual channel is any virtual channel in the second virtual channel group.

18. The apparatus according to claim 16, wherein the processor is further configured to update the second virtual channel group based on a current congestion degree of a virtual channel in the first virtual channel group.

19. The apparatus according to claim 15, wherein the first data flow is a data flow of a first service type, a virtual channel in the first virtual channel group is a virtual channel in a virtual channel group corresponding to the data flow of the first service type, at least one virtual channel in the first virtual channel group is different from at least one virtual channel in a virtual channel group corresponding to a data flow of a second service type, and the first service type is different from the second service type.

* * * * *